US012145393B1

(12) United States Patent
Chen et al.

(10) Patent No.: US 12,145,393 B1
(45) Date of Patent: Nov. 19, 2024

(54) GREETING CARD ASSEMBLY WITH SIMULATED INSTRUMENT PLAY

(71) Applicants: 100 Greetings, LLC, Clearwater, FL (US); Jast Company Limited, Kowloon (HK)

(72) Inventors: Jen-Lin Chen, Cupertino, CA (US); Anthony Carl T. Gonzales, Parañaque (PH); Jay Kamhi, Belleair, FL (US)

(73) Assignees: JAST COMPANY LIMITED, Kowloon (HK); 100 Greetings, LLC, Clearwater, FL (US)

( * ) Notice: Subject to any disclaimer, the term of this patent is extended or adjusted under 35 U.S.C. 154(b) by 0 days.

(21) Appl. No.: 18/450,329

(22) Filed: Aug. 15, 2023

(51) Int. Cl.
*G09F 1/04* (2006.01)
*B42D 15/02* (2006.01)
*B42D 15/04* (2006.01)

(52) U.S. Cl.
CPC ......... *B42D 15/022* (2013.01); *B42D 15/042* (2013.01); *G09F 1/04* (2013.01)

(58) Field of Classification Search
CPC ........ B42D 15/022; B42D 15/042; G09F 1/04
See application file for complete search history.

(56) References Cited

U.S. PATENT DOCUMENTS

| | | | |
|---|---|---|---|
| 2,974,434 A | | 3/1961 | Gibson |
| 3,228,138 A | | 1/1966 | Lohnes |
| 3,995,388 A | | 12/1976 | Penick et al. |
| 4,349,973 A | | 9/1982 | Penick et al. |
| 6,199,308 B1 | | 3/2001 | Westendorp |
| 6,259,006 B1 | * | 7/2001 | Parienti .................... G10H 1/32 84/427 |
| 7,292,681 B2 | | 11/2007 | Pines |
| 7,815,108 B2 | * | 10/2010 | Schacherer ........... G07F 7/0833 235/487 |
| 7,845,099 B2 | | 12/2010 | Ross et al. |
| 8,418,384 B2 | | 4/2013 | Jin et al. |
| 8,584,385 B2 | | 11/2013 | Mayer et al. |
| 8,595,961 B2 | | 12/2013 | Mayer et al. |
| 8,647,203 B2 | * | 2/2014 | Albrecht ............ G06Q 30/0207 200/16 R |
| 8,752,313 B2 | | 6/2014 | Wilson et al. |
| 9,481,195 B1 | | 11/2016 | Parkinson et al. |
| D792,510 S | | 7/2017 | Flores |
| 9,764,584 B1 | * | 9/2017 | Dennis ................. B42D 15/027 |
| D803,936 S | * | 11/2017 | Flores .............................. D19/1 |

(Continued)

*Primary Examiner* — Cassandra Davis

(74) *Attorney, Agent, or Firm* — La Morte & Associates P.C.

(57) ABSTRACT

A greeting card assembly having an electronics unit is embedded into the card. Electronics that play a length of music containing consecutive notes that can be selectively played over the speaker. A graphic of at least one instrument is displayed in the card. At least one activation sensor is provided within the graphic. Each activation sensor can be triggered by touching the graphic where the activation sensor is located. When an activation sensor is triggered, the electronics unit plays only one or two notes from the length of music. In this manner, to play the full length of music, the activation sensor must be repeatedly triggered. By strategically positioning the activation sensor in the graphic of the instrument, the repeated triggering of the activation sensor provides the appearance that a user is actually playing the instrument depicted in the graphic.

15 Claims, 8 Drawing Sheets

(56) References Cited

U.S. PATENT DOCUMENTS

| | | | | |
|---|---|---|---|---|
| 10,155,173 | B2 | 12/2018 | Simmons et al. | |
| 11,577,539 | B1 | 2/2023 | Chen et al. | |
| 2008/0016732 | A1 | 1/2008 | Gardi | |
| 2011/0197742 | A1 * | 8/2011 | Liotta .................. | H04R 1/1033 84/730 |
| 2011/0258892 | A1 | 10/2011 | Taylor et al. | |
| 2011/0272260 | A1 * | 11/2011 | Wallace ............... | H03K 17/975 200/300 |
| 2011/0283572 | A1 | 11/2011 | Mayer et al. | |
| 2013/0000166 | A1 * | 1/2013 | Budzar ................ | B42D 15/022 40/124.03 |
| 2013/0074380 | A1 | 3/2013 | Mayer et al. | |
| 2013/0139418 | A1 | 6/2013 | Bogdanski et al. | |
| 2013/0255115 | A1 | 10/2013 | Hughes et al. | |
| 2013/0269225 | A1 | 10/2013 | Nelson | |
| 2017/0087481 | A1 | 3/2017 | Simmons et al. | |
| 2018/0244097 | A1 | 8/2018 | Bassett et al. | |
| 2019/0054755 | A1 | 2/2019 | Garbos et al. | |
| 2023/0166553 | A1 | 6/2023 | Chen et al. | |

* cited by examiner

GREETING CARD ASSEMBLY WITH SIMULATED INSTRUMENT PLAY

BACKGROUND OF THE INVENTION

1. Field of the Invention

In general, the present invention relates to greeting cards that contain various electronic features that enable the greeting card to play music when opened. Furthermore, the present invention relates to greeting cards with integrated switches that enable a user to interact with the electronics embedded in the card.

2. Prior Art Description

Greeting cards have been made and sold for centuries. In modern times, a greeting card is typically made from a folded piece of thick paper stock. This requires that the card be unfolded or "opened" in order to read the message printed on the card.

Many greeting cards have panels and various folded constructs that are glued to the stock paper substrate of the card. This creates layers of paper on either side of the fold line. Since a greeting card can have a layered construction, it is possible for electronic components, such as circuit boards and batteries, to be integrated into the layered structure of the greeting card. The electronic components provide the greeting card with the ability to play music or flash lights when the greeting card is opened. Such prior art greeting cards are exemplified by U.S. Pat. No. 11,577,539 to Chen and U.S. Patent Application Publication No. 2023/0166553 to Chen.

A prior art greeting card typically contains an on/off switch that automatically activates the electronics of the greeting when the greeting card is opened. In this manner, the greeting card will only play music and/or flash lights when the greeting card is opened. The on/off switch prevents the electronics from being inadvertently activated when the greeting card is closed and is compressed in an envelope.

Although, the automatic triggering of the electronics in a greeting card can be surprising to the person opening the card, the music and/or lights played by the greeting card can quickly become annoying or embarrassing. To stop the greeting card from continuously playing music and/or flashing lights, the card is often prematurely closed by the individual who receives the card. This often prevents the individual who receives the card from reading any message printed in the card, and/or appreciating the graphics contained within the card.

A need therefore exists for an improved greeting card assembly that contains electronics, wherein the electronics must be actively and intentionally triggered as an individual reads the card. In this manner, any messages and/or graphics contained within the greeting card are enhanced by the electronics rather than overwhelmed by the electronics. These needs are met by the present invention as described and claimed below.

SUMMARY OF THE INVENTION

The present invention is a greeting card assembly that contains a first flap and a second flap that are joined at a central fold seam. The first flap can be rotated over the second flap to a closed configuration or away from the second flap to an open configuration. An electronics unit is embedded into the card. The electronics unit contains an integrated circuit with a built-in memory or a separated ROM. The electronics unit plays a length of music containing consecutive notes that can be selectively heard through a speaker.

A graphic of at least one instrument is displayed in the card. At least one activation sensor is provided on, in or under the graphic. Each activation sensor can be triggered by touching the graphic at the position where the activation sensor is located. When an activation sensor is triggered, the electronics unit plays only one or two notes from the length of music. In this manner, to play the full length of music, the activation sensor must be repeatedly triggered.

By strategically positioning the activation sensor in the graphic of the instrument, the repeated triggering of the activation sensor provides the appearance that a user is actually playing the instrument depicted in the graphic. The user can control the rate of play by controlling the rate at which the graphic is contacted. In this manner, the user controls the play of the music and is more likely to appreciate the card and its contents.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention greeting card assembly can be embodied in many ways, only a few exemplary embodiments are illustrated. The exemplary embodiments are shown for the purposes of explanation and description. The exemplary embodiments are selected in order to set forth one of the best modes contemplated for the invention. The illustrated embodiments, however, are merely exemplary and should not be considered limiting when interpreting the scope of the claims.

Figure 1:
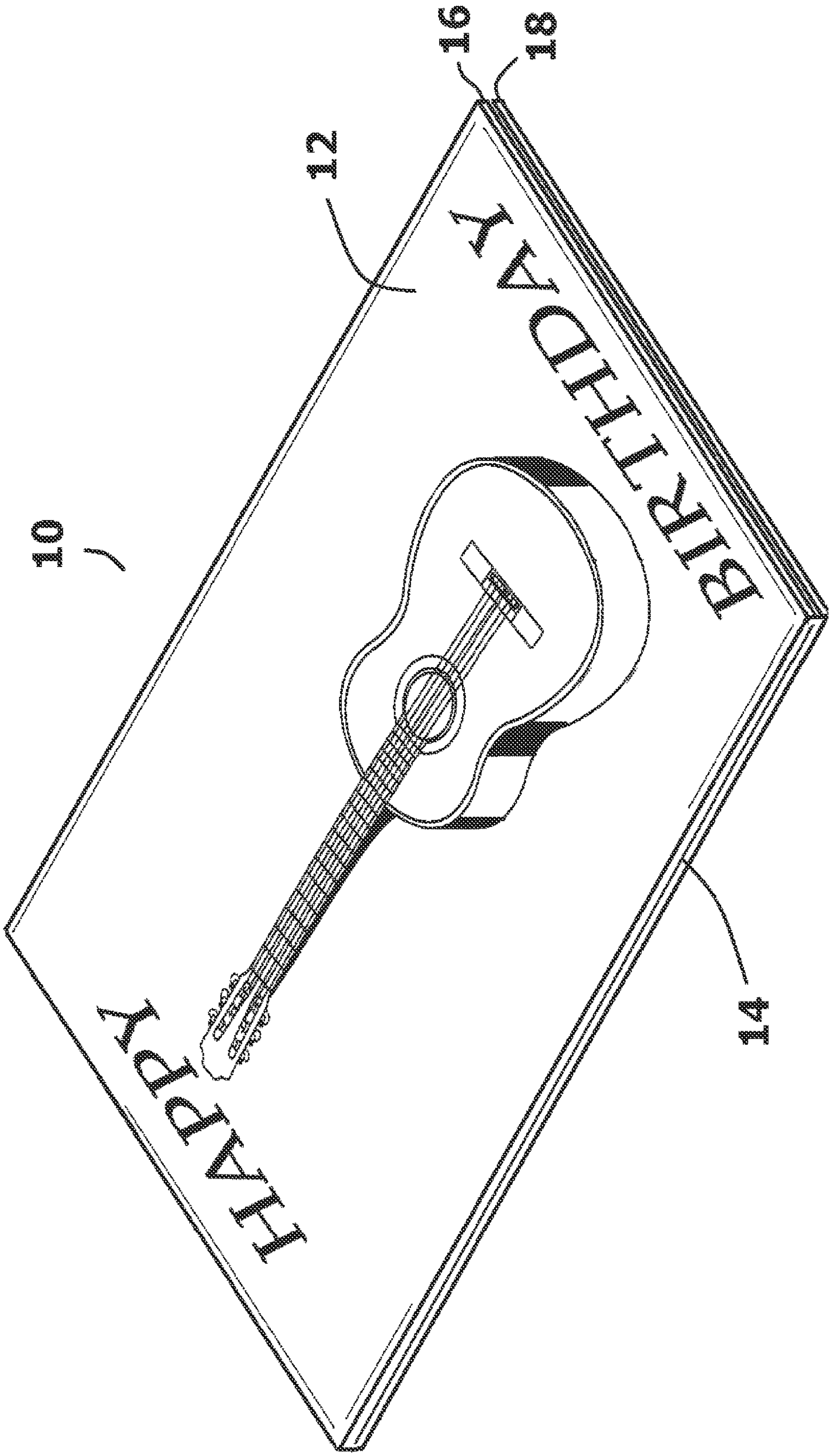
FIG. 1 shows a first exemplary embodiment of a greeting card assembly in a closed configuration.
Figure 2:
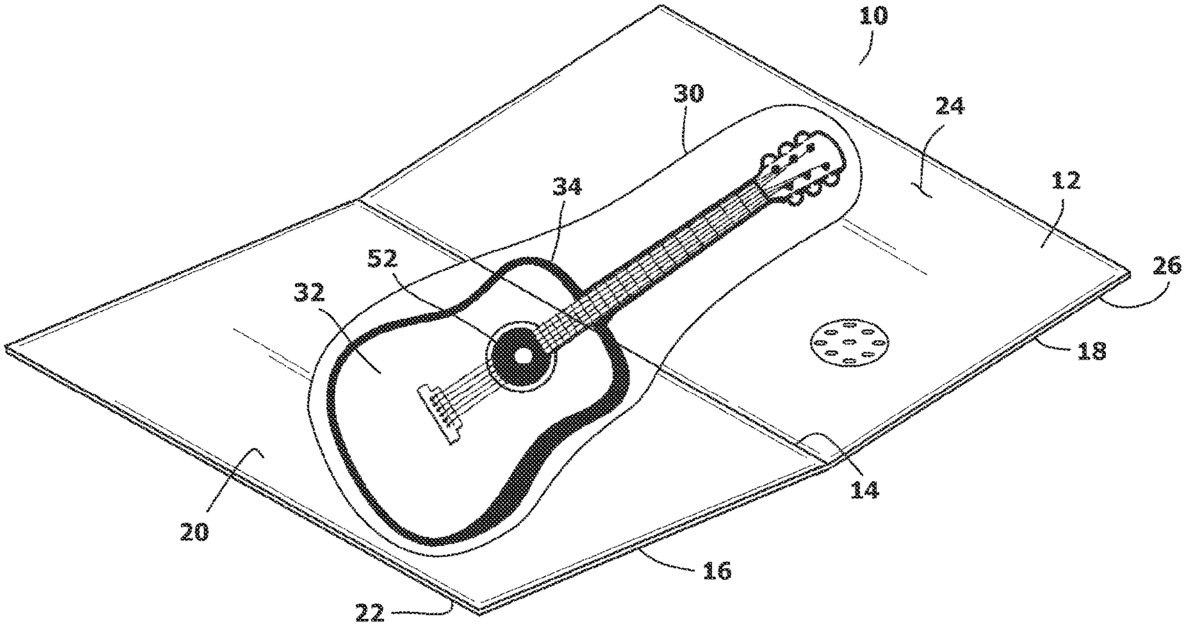
FIG. 2 shows a first exemplary embodiment of a greeting card assembly in an open configuration.
Figure 3:
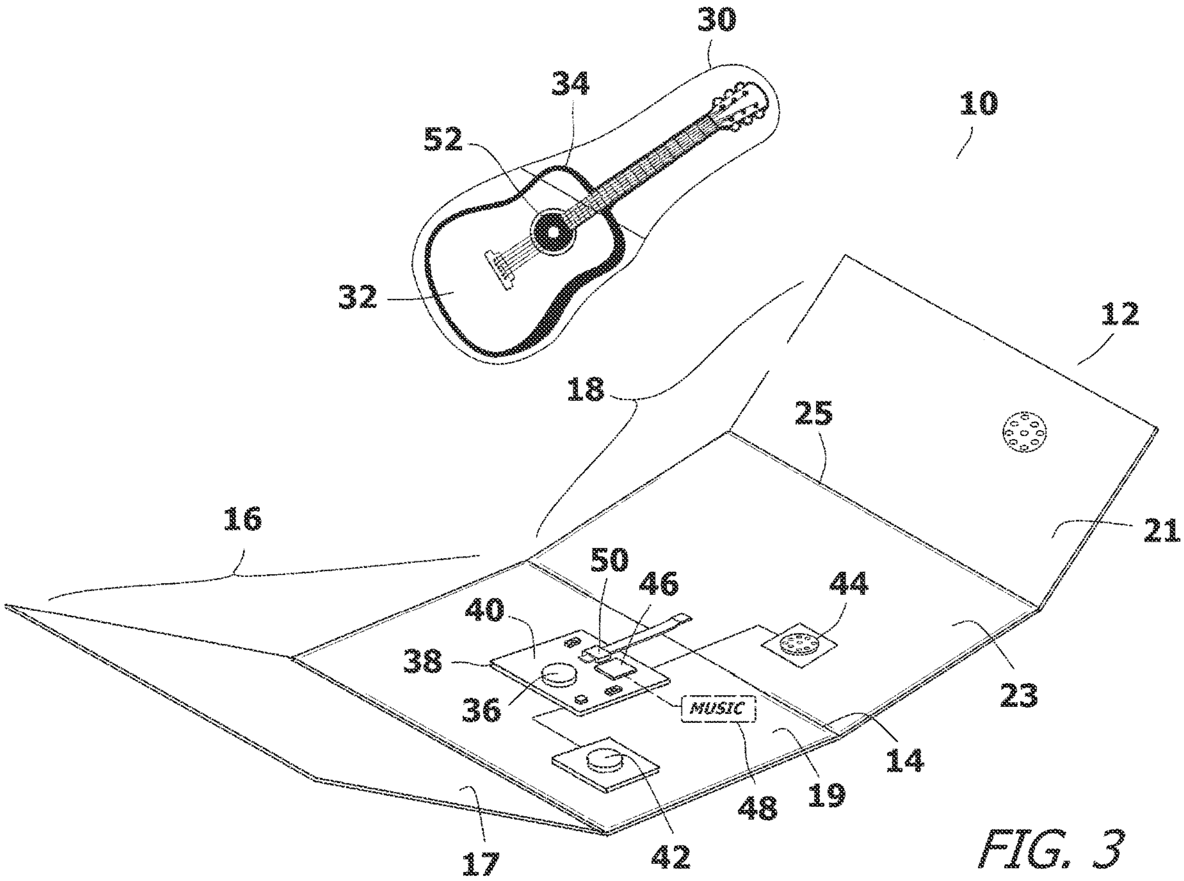
FIG. 3 shows an exploded view of the exemplary embodiment of FIG. 2.

Referring to FIG. 1 in conjunction with FIG. 2 and FIG. 3, a greeting card assembly 10 is shown. The greeting card assembly 10 has a base substrate 12 with a central fold seam 14. This divides the base substrate 12 into two equal sections 16, 18. The first section 16 folds over the second section 18, therein forming the principal shape of a greeting card.

Each section 16, 18 has a two-layered construction. That is, the first section 16 has a top layer 17 and a bottom layer 19. Likewise, the second section 18 has a top layer 21 and a bottom layer 23. The two-layer construction of each section 16, 18 can be created in two ways. In a first method, the sections 16, 18 of the base substrate 12 can contain secondary folds 25 that enable the sections 16, 18 to fold over themselves. This construction is illustrated. In a second method, a secondary substrate can simply be adhered to the base substrate.

When the first section 16 folds over the second section 18, the greeting card assembly 10 is considered closed and an interior surface 20 of the first section 16 faces an interior surface 24 of the second section 18. When the first section 16 is rotated away from the second section 18 to a configuration where the first section 16 and the second section 18 are generally coplanar, then the greeting card assembly 10 is considered open.

An interactive construct 30 is provided. The interactive construct 30 includes graphics 32 that depict at least one instrument 34. The interactive construct 30 can have multiple forms. In its simplest form, the interactive construct itself can be graphic that are printed onto the interior surface 20 of the first section 16 and/or the interior surface 24 of the second section 18. The interactive construct can also be a pop-up feature that looks like an instrument or contains graphics depicting an instrument. In the illustrated embodiment, the interactive construct 30 is flat feature that mounts onto the interior surfaces 20, 24 of the two sections 16, 18. This makes variation of the greeting card 10 easy to manufacture, wherein different variations of the interactive construct 30 can be attached to the same underlying card.

One or more activation sensors 36 are provided on, in, or under the interactive construct 30. Preferably, the activation sensors 36 are hidden from site by being placed underneath of the interactive construct 30. The activation sensors 36 are positioned in one or more places that correspond to where the depicted instrument 34 would be contacted when played.

The activation sensors 36 are part of an electronics unit 38 that is integrated into the greeting card assembly 10. The electronics unit 38 can be interposed between the layers of each section or between the layers and the interactive construct 30. In addition to the activation sensors 36, the electronics unit 38 contains a logic board 40, a battery 42, a speaker 44, and a memory 46. The memory 46 can be integrated or separate, wherein the memory 46 holds a segment of pre-recorded music 48. The segment of pre-recorded music 48 is preferably between ten seconds and sixty seconds in length. The pre-recorded music 48 consists of a sequence of notes and/or chords that can be played over the speaker 44.

An on/off switch 50 is provided. When the greeting card assembly 10 is unfolded into its open configuration, the on/off switch 50 is automatically switched from an "off" condition to an "on" condition. Conversely, when the greeting card assembly 10 is folded closed, the on/off switch is moved to an "off" condition. When in the "off" condition, power is disconnected from the logic board 40 and the electronics unit 38 is dormant. When the greeting card assembly 10 is opened, the on/off switch 50 directs power from the battery 42 to the logic board 40, therein powering the logic board 40.

The pre-recorded music 48 is played in a very specific manner when the electronics unit 38 is activated. Once the logic board 40 is powered, the logic board 40 will play only one or two notes of the pre-recorded music 48 each time one of the activation sensors 36 is triggered.

In FIG. 2 and FIG. 3, the interactive construct 30 is configured with the graphics 32 of a guitar. The graphic 32 includes a sound hole 52. An activation sensor 36 is positioned on, in, or under the graphics 32 in the area of the sound hole 52. In this manner, when a user touches the graphics 32 in the area of the sound hole 52, the activation sensor 36 is triggered. It will be understood that contacting the graphics 32 of the guitar in the area of the sound hole 52 provides the appearance that the user is strumming the guitar on the greeting card assembly 10.

Once the activation sensor 36 is triggered, the logic board 40 plays only one or two notes of the pre-recorded music 48. The pre-recording music 48 matches the motif of the instrument 34 in the graphics 32. Accordingly, if a guitar is shown in the graphics 32, then the pre-recorded music 48 is preferably guitar music. If the graphics 32 depict an instrument 34 such as a violin or mandolin, then the pre-recorded music 48 would preferably be violin music or mandolin music.

The pre-recorded music 48 is played one or two notes at a time, each time an activation sensor 36 is triggered. Accordingly, in order to play the full length of the pre-recorded music 48, a user must repeatedly trigger the activation sensor 36. As a result, a user would have to repeatedly strum the sound hole 52 of the depicted guitar in order to play the full length of pre-recorded music 48. The rhythm at which the pre-recorded music 48 is played is completely dependent upon the cadence at which the activation sensors 36 are triggered. As a result, in order to play the full length of the pre-recorded music 48 in a consistent rhythm and cadence, one or more activation sensors 36 must be triggered with the appropriate beat for the music. The individual interacting with the greeting card assembly 10 must therefore repeatedly move their fingers over the sound hole 52 of the depicted guitar. This causes a user to appear to play the instrument 34 depicted in the graphic 32. The illusion that the user is actually playing the depicted instrument 34 is supplemented by the fact that the beat of the music being played is controlled by the user and matches the movement of the user's finger or hand across the graphics 32.

Figure 4:
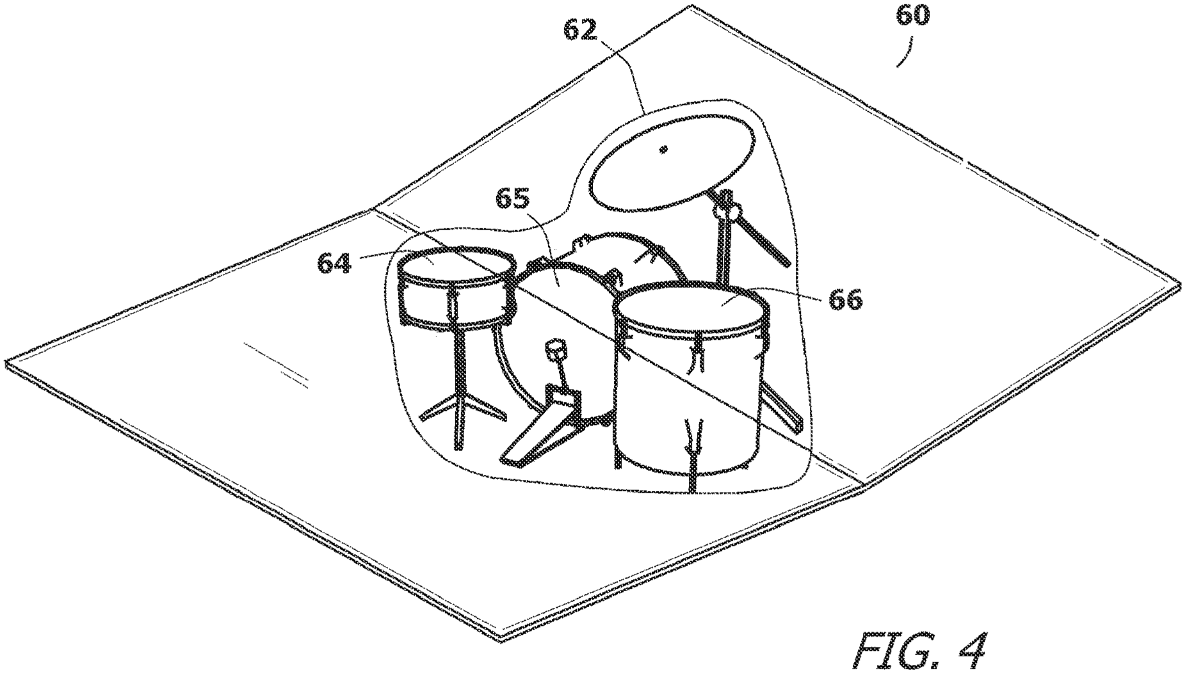
FIG. 4 shows a second exemplary embodiment of a greeting card assembly in an open configuration.
Figure 5:
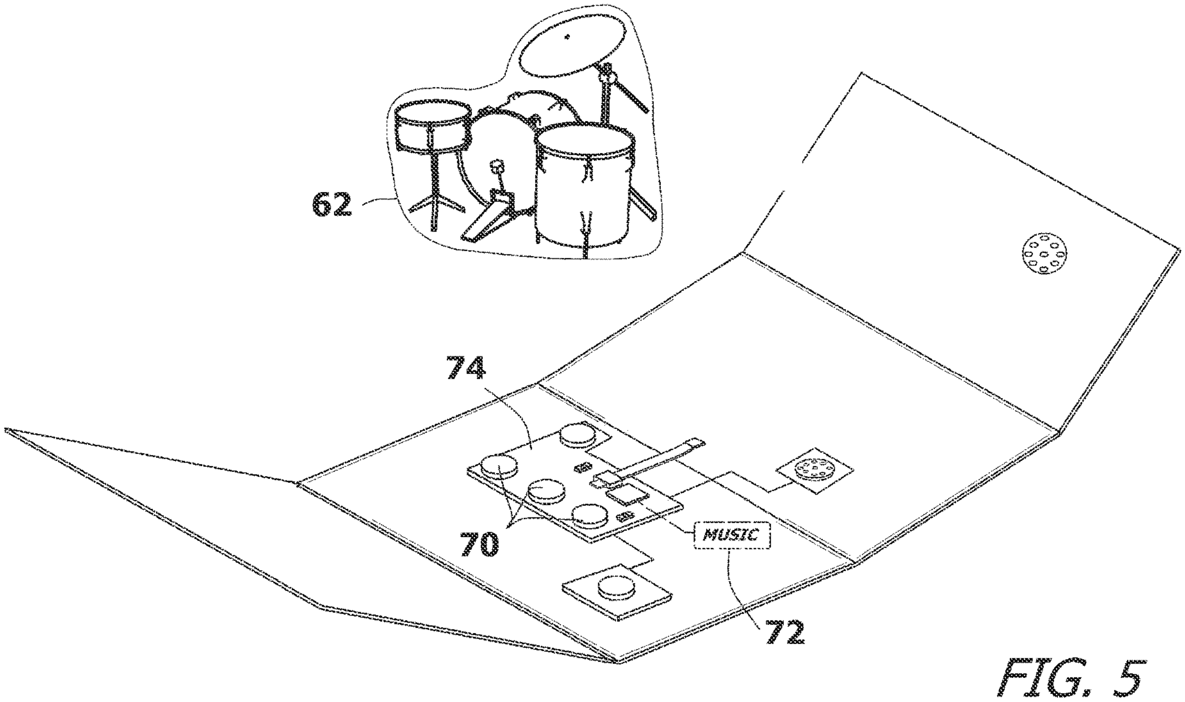
FIG. 5 shows an exploded view of the exemplary embodiment of FIG. 4.

Referring to FIG. 4 and FIG. 5, an alternate embodiment of the greeting card assembly 60 is shown. In this embodiment, a graphic 62 is shown for a set of drums. The graphic 62 for the set of drums shows multiple drums 64, 65, 66. An activation sensor 70 is provided for each of the drums 64, 65, 66 depicted. The pre-recorded music 72 is preferably drum music in order to match the motif of the graphics 62. In order to play the pre-recorded music 72, a user must tap or otherwise contact one of the depicted drums 64, 65, 66. This will trigger an activation sensor 70 and cause one or two notes of the pre-recorded music 72 to play. The cadence of the music being played depends upon the rhythm of the tapping of the depicted drums 64, 65, 66. In this manner, the tapping of the depicted drums 64, 65, 66 appears as though the user were actually playing drums. As an option, the logic board 74 can prevent any one of the activation sensors 70 from being activated twice in a row. (In this manner, a user must tap a different drum 64, 65, 66 in the graphics 62 each time a note or two is to be played. This adds to the illusion that the user contacting the greeting card assembly 60 is actually playing the drums.

Figure 6:
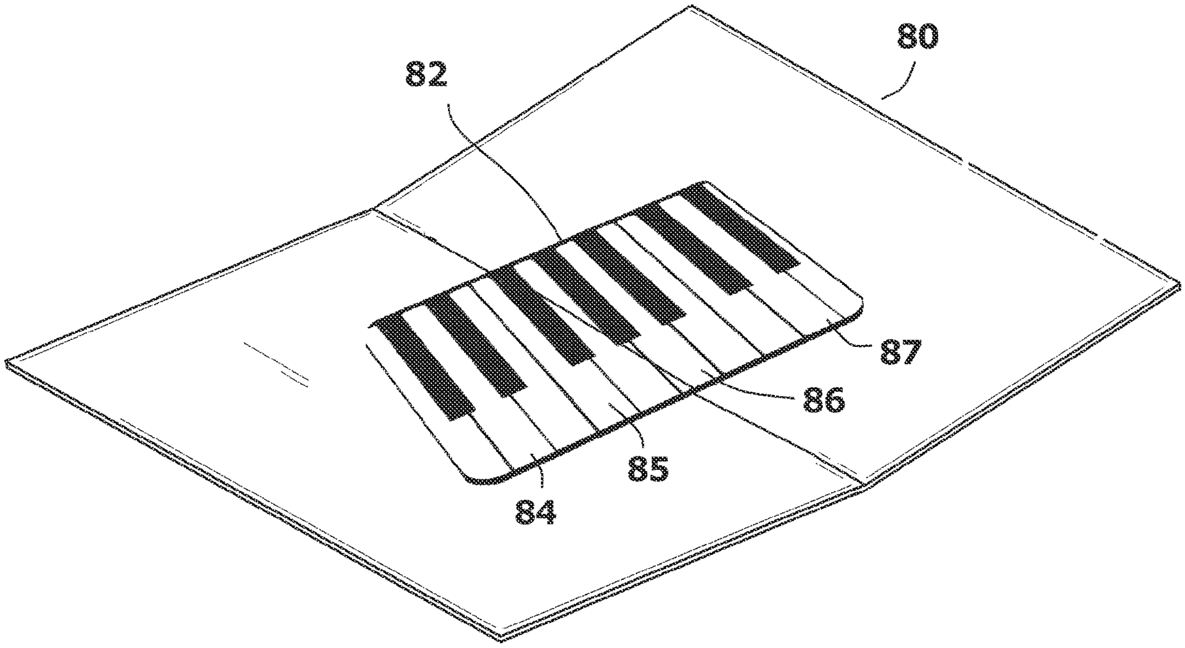
FIG. 6 shows a third exemplary embodiment of a greeting card assembly in an open configuration.
Figure 7:
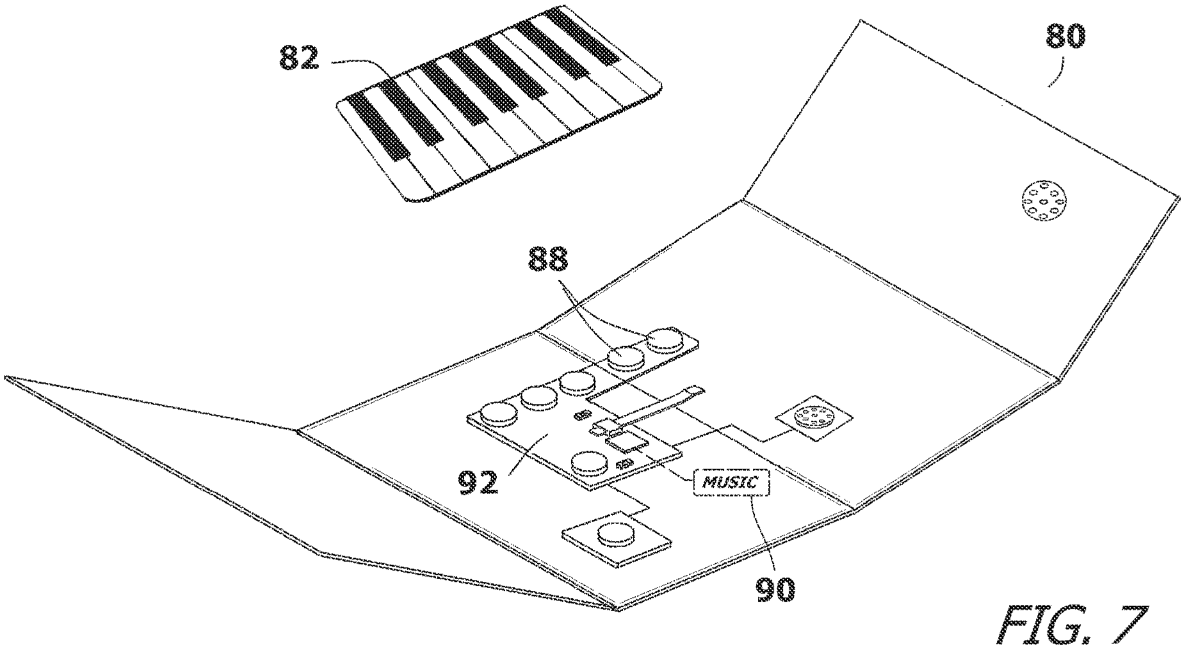
FIG. 7 shows an exploded view of the exemplary embodiment of FIG. 6.

Referring to FIG. 6 and FIG. 7, an alternate embodiment of the greeting card assembly 80 is shown. In this embodiment, a graphic 82 is shown for a piano that has a plurality of keys 84, 85, 86, 87. Activation switches 88 are provided for at least some of the keys 84, 85, 86, 87. The pre-recorded music 90 is preferably piano music in order to match the motif of the graphic 82. In order to play the pre-recorded music 90, a user must tap or otherwise contact one of the keys 84, 85, 86, 87. This will trigger one or more activation sensors 88 and cause one or two notes of the pre-recorded music 90 to play. The notes being played have no correlation to the position of the keys 84, 85, 86, 87 on the depicted piano graphic 82. Only the cadence of the music being played depends upon the contact of the depicted keys 84, 85, 86, 87. The same music pays regardless of what keys 84, 85, 86, 87 are contacted. However, notes only play when the keys 84, 85, 86, 87 are contacted. In this manner, the contact of the keys 84, 85, 86, 87 appears as though the user is actually playing the piano. Furthermore, the logic board 92 can prevent any one of the activation switches 88 from being activated twice in a row. In this manner, a user must touch a different one of the keys 84, 85, 86, 87 in the graphics 82 each time a note or two is to be played. This adds to the illusion that the user contacting the greeting card assembly 80 is actually playing the depicted piano.

Figure 8:
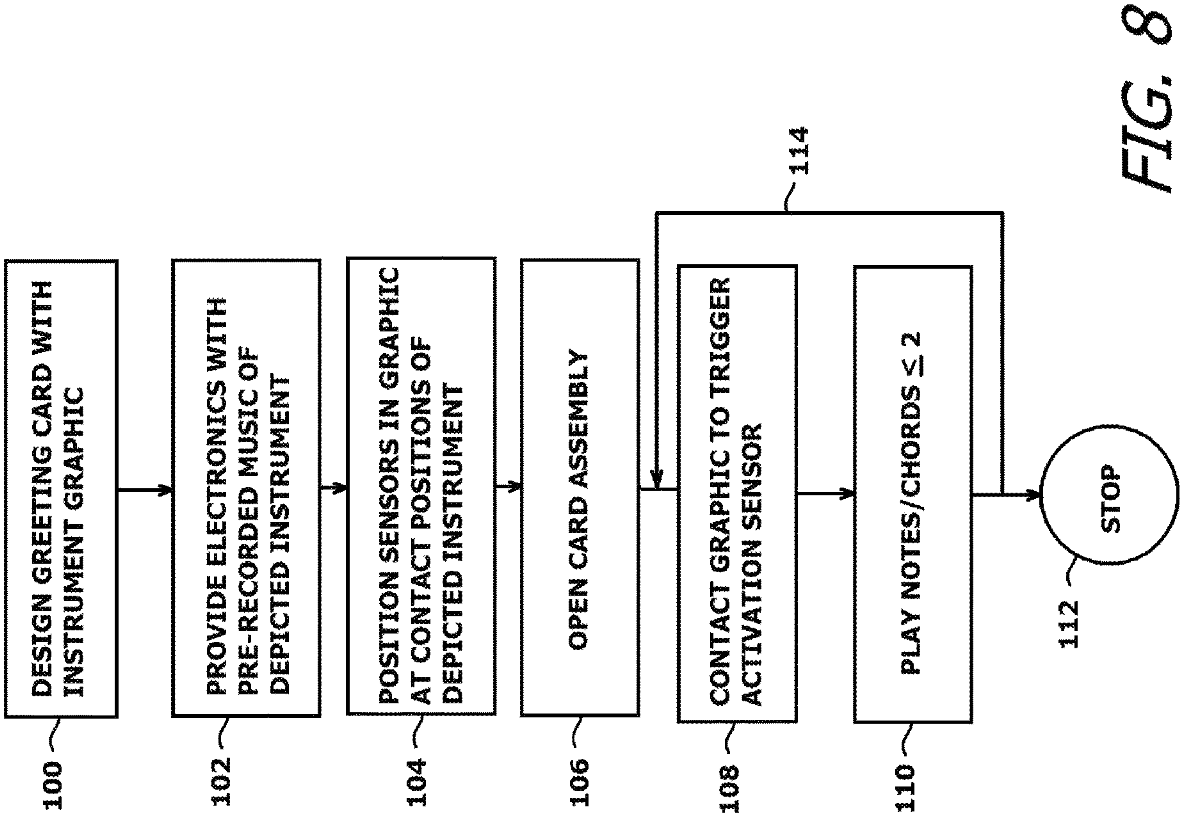
FIG. 8 shows a block logic diagram outlining a method of operations for the present invention.

Referring to FIG. 8 in conjunction with FIG. 1 and FIG. 2, the methodology for making a greeting card assembly 10 is summarized. First, a greeting card assembly 10 is designed that includes graphics 32 of an instrument 34. See Block 100. An electronics unit 38 is provided that is sized to fit within the greeting card assembly 10. See Block 102. The electronics unit 38 contains a recording of a music that contains a plurality of notes and/or chords that are, or sounds like, notes from the particular instrument 34 depicted in the graphic 32. The electronics unit 38 is connected to one or more activation sensors 36. The activation sensors 36 can be touch sensors, touch switches, motion sensors, light sensors, membrane sensors, or proximity sensors. The electronics unit 38 is also connected to an on/off switch 50 that turns the electronics unit 38 "on" when the greeting card assembly 10 is open.

A graphic 32 of an instrument 34 is positioned over the electronics unit 38 within the greeting card assembly 10. The graphic 32 depicts at least one contact area that would be contacted if the instrument were real and were being played. See Block 104.

When the greeting card assembly 10 is opened, the electronics unit 38 is powered, but no music plays. See Block 106. In order for the pre-recorded music 48 to start playing, the individual holding the greeting card assembly 10 must touch the graphic 32 in the area of one of the activation sensors 36. See Block 108. Once an activation sensor 36 is activated, one or two notes of the pre-recorded music 48 play and then the music stops. See Block 110 and Block 112. To keep the pre-recorded music 48 playing, the user must continue to contact the graphic 32 and trigger an activation sensor 36. See loop line 114. This is preferably done in the beat of the pre-recorded music 48 so that the pre-recorded music 48 will continue to play with the proper cadence.

It will be understood that the embodiments of the present invention that are illustrated and described are merely exemplary and that a person skilled in the art can make many variations to those embodiments. For instance, instruments other than those illustrated can be depicted in the graphics. All such embodiments are intended to be included within the scope of the present invention as defined by the claims.

What is claimed is:

1. A greeting card assembly, comprising:

a substrate;

electronics that produce a selection of music, wherein said selection of music contains consecutive notes;

a speaker for audibly playing said selection of music;

a graphic of at least one instrument; and activation sensors that can be triggered by contacting said graphic, wherein said speaker plays no more than two of said consecutive notes of said selection of music each time said activation sensors are triggered, and wherein any one of said activation sensors is temporarily deactivated after being triggered to prevent any one of said activation sensors from being repeatedly triggered twice in a row.

2. The assembly according to claim 1, wherein said selection of music is a pre-recorded selection produced by said at least one instrument depicted in said graphic.

3. The assembly according to claim 1, wherein said substrate has a first section and a second section that are joined along a fold seam, wherein said first flap can be rotated over said second flap to a closed configuration and can be rotated away from said second flap to an open configuration.

4. The assembly according to claim 3, wherein said electronics are disabled when said substrate is in said closed configuration.

5. The assembly according to claim 1, wherein said graphic of said at least one instrument shows at least one area on said at least one instrument that is contacted to play said at least one instrument.

6. The assembly according to claim 1, wherein said activation sensors are selected from a group consisting of touch sensors, touch switches, motion sensors, light sensors, membrane sensors, and proximity sensors.

7. The assembly according to claim 1, wherein said graphic of said at least one instrument is a graphic of a guitar having a sound hole, wherein said activation sensors are disposed proximate said sound hole.

8. The assembly according to claim 1, wherein said graphic of said at least one instrument is a graphic of a piano having keys, wherein said activation sensors are disposed proximate at least some of said keys.

9. The assembly according to claim 1, wherein said graphic of said at least one instrument is a graphic of drums, wherein said activation sensors are disposed proximate at least some of said drums.

10. A method, comprising:

providing a card containing an electronics unit and a graphic of an instrument, wherein said electronics unit can play a length of music that sounds like said length of music was played by said instrument in said graphic;

providing activation sensors on said card in, on or under said graphic; and playing only a portion of said length of music each time any one of said activation sensors is triggered on said card temporarily deactivating any one of said activation sensors after being triggered to prevent any one of said activation sensors from being repeatedly triggered twice in a row.

11. The method according to claim 10, wherein said length of music contains sequential notes and said portion of said length of music is no longer than two of said sequential notes.

12. The method according to claim 10, wherein said card can open and close and said electronics unit is automatically disabled when said card is closed.

13. The method according to claim 10, wherein said graphic of said instrument shows areas of said instrument that are to be contacted when played, wherein said activation sensors are disposed in, on or under at least one of said areas.

14. A method, comprising:

providing a card containing an electronics unit and a graphic of an instrument, wherein said electronics unit can play a length of music;

providing activation sensors on said card in, on, or under said graphic; and playing only a portion of said length of music each time any one of said activation sensors is triggered on said card and temporarily deactivating any one of said activation sensors after being triggered to prevent any one of said activation sensors from being repeatedly triggered twice in a row.

15. The method according to claim 14, wherein said length of music contains sequential notes and said portion of said length of music is no longer than two of said sequential notes.

* * * * *